United States Patent [19]
Ishigami et al.

[11] 3,885,111
[45] May 20, 1975

[54] TERMINAL EQUIPMENT FOR LINCOMPEX TELEPHONE SYSTEM

[75] Inventors: Hikoichi Ishigami; Akira Sato; Seishi Kitayama; Kouhei Kobayashi, all of Tokyo, Japan

[73] Assignee: Kokusai Denshin Denwa Kabushiki Kaisha, Japan

[22] Filed: May 14, 1973

[21] Appl. No.: 359,878

[30] Foreign Application Priority Data

May 15, 1972 Japan .............................. 47-47905

[52] U.S. Cl. .............. 179/170.8; 333/14; 179/1 VL
[51] Int. Cl. ............................................. H04b 3/20
[58] Field of Search ... 179/15.55 R, 15.55 T, 170.2, 179/170.6, 170.8, 170.4, 41 A, 1 VL, 1 FS; 333/14; 325/16.62

[56] References Cited

UNITED STATES PATENTS

| | | | |
|---|---|---|---|
| 3,462,561 | 8/1969 | Deman | 179/170.2 |
| 3,465,106 | 9/1969 | Nagata | 179/170.2 |
| 3,596,011 | 7/1971 | Alexandrovich | 179/170.2 |
| 3,602,818 | 8/1971 | Carrette | 179/15.55 R |
| 3,780,233 | 12/1973 | Campanella | 179/170.2 |

*Primary Examiner*—Kathleen H. Claffy
*Assistant Examiner*—Thomas D'Amico
*Attorney, Agent, or Firm*—Robert E. Burns; Emmanuel J. Lobato; Bruce L. Adams

[57] ABSTRACT

A terminal equipment employed in a lincompex telephone system, in which a constant-level voice signal obtained by compressing a voice signal to a substantially constant level and level information indicating instantaneous level changes of the voice signal before compressed are mutually transmitted between an opposed pair of terminal equipments through a two way transmission medium and, in each terminal equipment, the original voice signal is reproduced from the transmitted constant-level voice signal and the level information. In accordance with this invention, the level information received and that to be transmitted are compared with each other and controlled in each terminal equipment. When the received level information is larger than that to be transmitted and also a predetermined first threshold value, the transmitting level information is controlled to be fixed at lower level information corresponding to a second threshod value sufficiently smaller than the first threshold value. When the received level information is smaller than the first threshold value and, when the level information to be transmitted is larger than the received level information while the received level information is larger than the first threshod valve, fixing of the transmitted level information at the lower level information is released.

2 Claims, 4 Drawing Figures

TERMINAL EQUIPMENT FOR LINCOMPEX TELEPHONE SYSTEM

This invention relates to a terminal equipment employed in a lincompex (Linked Compressor and Expander) telephone system, in which a constant-level voice signal, obtained by compressing a voice signal to a substantially constant level, and level information indicating instantaneous level changes of the voice signal before compressed are mutually transmitted between terminal equipments through a two-way transmission medium and, in each terminal equipment, the original voice signal is reproduced from the transmitted constant-level voice signal and the level information.

Hitherto, a conventional telephone system utilizing a short-wave communication circuit has adopted a system permitting only alternate transmission (i.e. voice operated device anti-singing system: VODAS) so as to prevent the loop gain of the communication circuit from going positive because of fluctuations in the net loss or in the relay loss due to fading, so that there was no possibility of the disturbance by echo in usual short-wave communication circuits. However, with recent introduction of a lincompex telephone system, as disclosed in a publication: POEEJ (Post Office Electrical Engineers Journal), vol 59, part 3, October, 1966, P163 – P167, Carter S. Wheelder, "The Lincompex System for the Protection of H. F. Radio Telephone Circuit"; a publication: BSTJ (Bell Systems Technical Journal), vol XLVI, Number 4, April, 1967, P677 – P720, J. M. Fraser, H. H. Haas and M. G. Schachitman, "An Improved High-Frequency Radiotelephone System Featuring Constant Net Loss Operation"; or "CCIR Recommendation" 455 (Conite Consulated International des Radio-communication), the circuit net loss can now be held constant and as a result of this, speech quality of the short-wave telephone circuit is substantially equal to that obtainable in a two-way wire telephone system. On the other hand, however, introduction of the lincompex telephone system has incurred deterioration of the speech quality which would be caused by the disturbance by echo in the presence of an unnegligible delay time in the propagation path, as in the case of a long-time delayed telephone circuit. To make matters worse, the use of the lincompex telephone system inevitably causes an increase of about 30 milli-seconds in the loop propagation time, which is inherent in this system. On the other hand, the short-wave telephone circuit is becoming more important for use in mobile stations including the maritime vessel stations and the like. In the case of lincompex telephone systems for the maritime vessel stations since ships move along sea routes on the earth, the longest loop propagation time reaches about 180 milli-seconds and the disturbance by echo is unavoidable. Accordingly, in the case of applying the lincompex telephone system to a long-distance, a short-wave telephone circuit or a short-wave mobile telephone circuit, it is absolutely necessary to install echo suppressors.

An object of this invention is to provide a terminal equipment employed in a lincompex telephone system capable of performing an echo suppression function by a simple circuit construction.

In accordance with the principle of this invention, the level information received and that to be transmitted are compared with each other and controlled in each terminal equipment. When the received level information is larger than that to be transmitted and also a predetermined first threshold value the transmitting level information is controlled to be fixed at a lower level information corresponding to a second threshold value sufficiently smaller than the first threshold value. When the received level information is smaller than the first threshold value and, when the level information to be transmitted is larger than the received level information while the received level information is larger than the first threshold value, fixing of the transmitted level information at the lower level information is released.

The principle, construction and operations of this invention will be understood from the following detailed description taken in conjunction with the accompanying drawings, in which.

Figure 1:
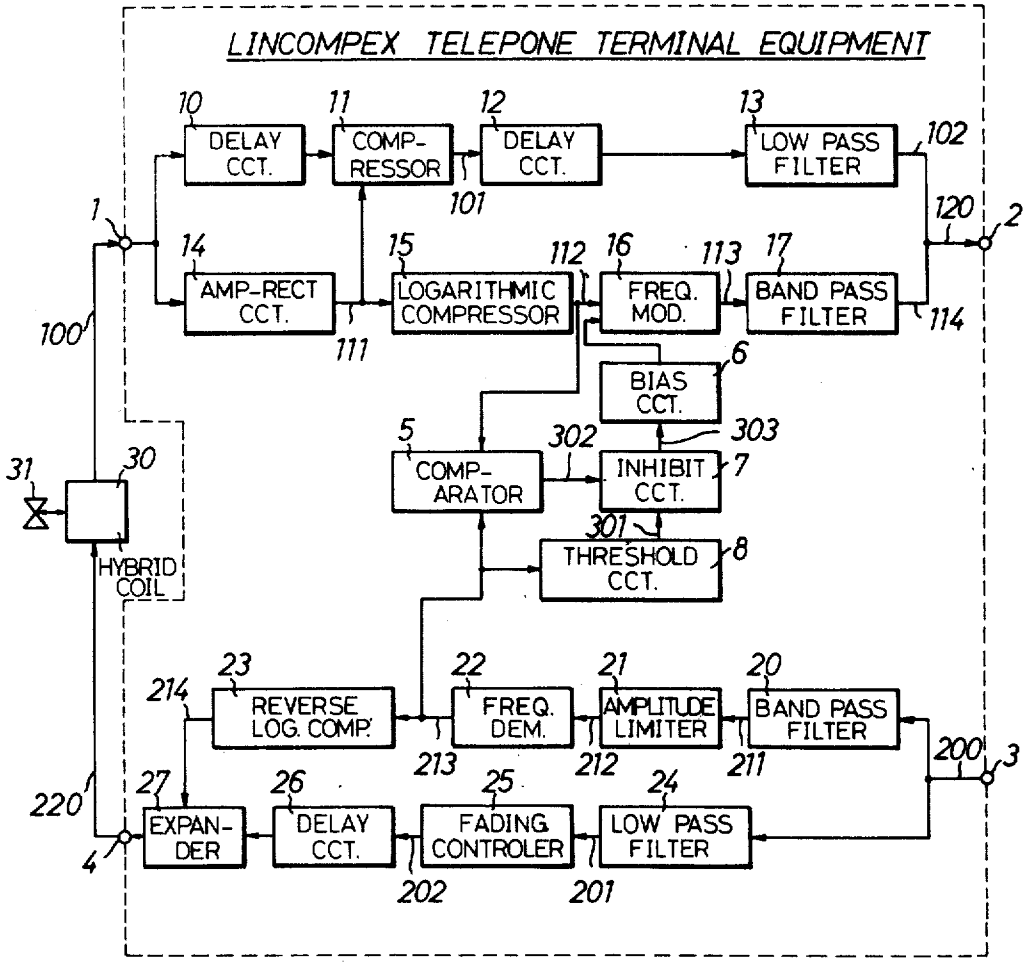
FIG. 1 is a block diagram illustrating an example of this invention.

With reference to FIG. 1, a voice signal (0.3 to 3.4 KHz) 100 from a near-end subscriber 31 is applied to a sending input terminal 1 of a lincompex telephone terminal equipment. This voice signal 100 passes through a hybrid coil 30 and is then divided into two signals, one of which is applied to a delay circuit 10 having a delay time of 1 to 2 milli-seconds and then fed to a compressor 11 having a time constant following the intonation of syllables to provide a constant level voice signal 101, which has been compressed to a constant level for each syllable. The constant level voice signal 101 thus obtained is supplied to a delay circuit 12 having a delay time of 6 to 8 milli-seconds and then fed to a low-pass filter 13 having a cut-off frequency of about 2.7 KHz to derive therefrom a constant level voice signal 102, which has been cut off at the frequency of 2.7 KHz. Consequently, the constant level voice signal 102 is a voice signal, which has a constant level for each syllable and lower frequency components cut-off at the frequency of about 2.7 KHz. On the other hand, the other part of the voice signal 100 is rectified by an amplifying rectifier 14 to obtain a DC signal 111. This DC signal 111 controls the compressor 11 for each syllable and, at the same time, it is subjected to logarithmic compression by a logarithmic compressor 15 to provide a DC signal 112. Consequently, the DC signal 112 represents the power of the voice signal 100 and, at the same time, linearly changes against the power logarithmic ratio of the voice signal 100. The DC signal 112 is supplied to a frequency modulator 16 to frequency-modulate the oscillation frequency of an oscillator therein. An obtained frequency-modulated wave 113 is frequency-limited by a band-pass filter 17 having a pass-band of about 120 Hz (usually in the frequency range of 2.7 to 3.0 KHz) to provide an FM output signal 114 separated in the frequency range from the constant level voice signal 102. The FM output signal 114 and the constant level voice signal 102 are combined with each other on the frequency base to obtain an output signal 120, which is transmitted through a transmitting output terminal 2 of the lincompex telephone terminal equipment.

A voice signal of a far-end subscriber is also transmitted after divided into a voice signal of constant level and an FM signal by the same operations as mentioned above and then applied to a near-end lincompex receiving input terminal 3. A voice signal 201 is extracted by a low-pass filter 24 and applied to a fading controller 25 formed with a compressor, which eliminates level fluctuations caused by fading during propagation. The output 202 of the fading controller 25 is applied to an expander 27 through a delay circuit 26 having a delay time of 6 to 8 milli-seconds. On the other hand, the FM signal representative of the level of the input voice signal 200 is extracted by a band-pass filter 20 having a pass-band of about 120 Hz to derive therefrom a signal 211, which is supplied to an amplitude limiter 21 to eliminate amplitude fluctuations caused by fading during propagation, thus providing a signal 212. This signal 212 is converted by a frequency demodulator 22 into a DC signal 213. The DC signal 213 represents the voice level of the far-end subscriber and, at the same time, linearly changes with respect to the power logarithmic ratio of the voice signal. This DC signal 213 is subjected to reverse-logarithmic conversion by a reverse-logarithmic compressor circuit 23 to provide a DC signal 214, by which the expander 27 is controlled to reproduce a far-end voice signal 220. The voice signal 220 thus obtained is transmitted to the near-end subscriber 31 through a lincompex receiving output terminal 4 and the hybrid coil 30. The delay circuit 26 is provided to compensate for a difference in delay between the voice signal and the control signal representing the level.

In the embodiment shown in FIG. 1, the signal 112 is representative of the level of the transmitted voice signal and its magnitude linearly varies with the logarithmic ratio of the transmitted voice level. Further, the signal 213 represents the level of the received voice signal and its magnitude linearly varies with the logarithmic ratio of the received voice level. Consequently, the magnitudes of the transmitted voice level and the received voice level, which are necessary for the echo suppressing function, can be obtained from the signals 112 and 213. The following will described with respect to the operations of each circuit and of the echo suppressing function.

Upon application of a received voice signal to the receiving input terminal 3, the magnitude of the output 213 derived from the frequency demodulator 22 at that time is representative of the received voice level. The DC signal 213 is fed to a threshold detector 8. The threshold detector 8 is one which detects whether or not the magnitude of the DC signal 213 exceeds a value corresponding to a predetermined threshold value (for example, −31 dBm) of the received voice level, and which derives therefrom a plus (+) or minus (−) signal depending upon whether or not the DC signal 213 exceeds the value corresponding to the threshold level of −31 dBm. The output signal 301 of the threshold detector 8 is applied to a bias circuit 6 through an inhibit circuit 7 which is usually opened. If the signal 301 is plus (+), the bias circuit 6 applies a constant bias to the input of the frequency modulator 16 regardless of the magnitude of the DC output 112 of the logarithmic compressor 15, thus fixing the frequency modulator 16 to oscillate at a frequency corresponding to a condition that no voice input is applied to the transmitting input terminal 1. However, if the signal 301 is minus (−), the bias circuit 6 is not activated and the output frequency of the frequency modulator 16 is modulated by the DC output 112 of the logarithmic compressor 15 as usual. Consequently, when the received voice level exceeds the aforesaid threshold level, echo passes around through the hybrid coil 30 to the transmitting input terminal 1. Moreover, the frequency modulator 16 oscillates at a frequency corresponding to the state of no input while the output 112 of the logarithmic compressor 15 has a constant level, and the echo is suppressed by the expander 27 of the receiving side.

Figure 2:
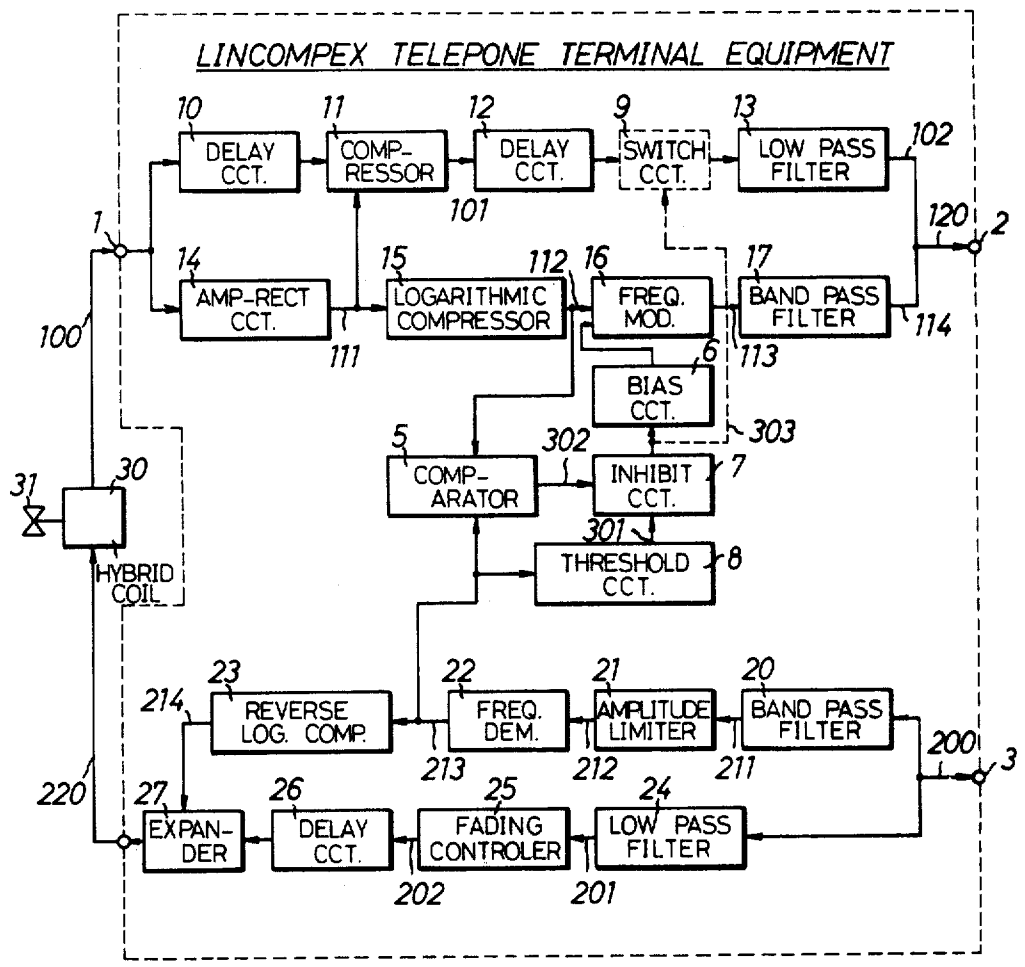
FIG. 2 is a block diagram illustrating another example of this invention.

It must be noted here that echo propagates in the air from the transmitting side of the far-end party and is suppressed by the expander of the receiving side. In order to prevent bad influences such as radio interference and the like on other circuits by unnecessary echo propagation, it is sufficient only to connect the output 303 of the inhibit circuit 7 to a switching circuit 9 as shown in FIG. 2, and actuate the switching circuit 9 only in the presence of the signal 303, thereby to cut-off the echo. If importance is attached to simplification and economization of construction, such control as indicated in FIG. 2 by the broken lines is unnecessary.

Next, a description will be given in connection with the case where the transmission interrupts the reception. A comparator 5 starts its comparison operation between the DC signal 213 of the receiving side and the DC signal 112 of the transmitting side only when the magnitude of the former exceeds a value corresponding to a predetermined threshold value (for example, −31dBm) of the received voice level and the magnitude of the latter also exceeds a value corresponding to another threshold value (for example, −30 dBm) of the transmitted voice level. When the DC signal 112 has become larger than the DC signal 213, the comparator 5 derives therefrom a plus (+) signal 302 to actuate the inhibit circuit 7, thereby inhibiting the signal 301 from actuating the bias circuit 6. Accordingly, when the threshold detector circuit 8 is actuated by the level of a voice signal being received and the bias circuit 6 is also activated, transmission is started. When the DC signal 112 has exceeded the signal 213, the comparator 5 provides the plus (+) signal 302 to actuate the inhibit circuit 7, thus stopping the operation of the bias circuit 6. Then the frequency modulator 16 is activated by the DC signal 112 representative of the original transmission level, thus completing interruption of transmission.

In the case of transmission only, no reception is achieved, so that the threshold detector 8 is not activated, and accordingly the bias circuit 6 also is not activated and transmission is achieved as it is.

Figure 3:
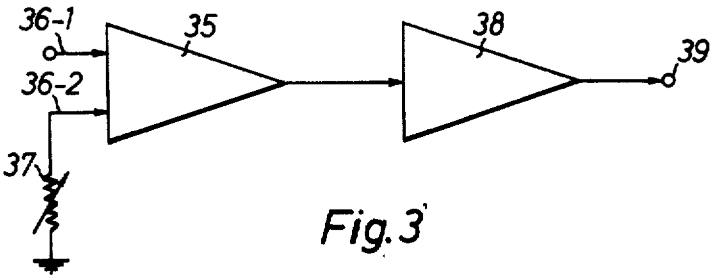
FIG. 3 is a block diagram illustrating an example of a threshold circuit employed in this invention.

In the above embodiments of this invention, the threshold detector 8 comprises, for example, a differential amplifier 35 and a buffer amplifier 38 as shown in FIG. 3. The differential amplifier 35 has an input terminal 36-1 receiving the DC signal 213 and an input terminal 36-2 connected to ground through a variable resistor 37. The output of the differential amplifier 35 corresponding to a difference between the DC signal 213 and a threshold level determined by the variable resistance 37 is applied to an output 39 through the buffer amplifier 38. The output terminal is connected to the inhibit circuit 7.

The inhibit circuit 7 comprises an inhibit gate for example.

Figure 4:
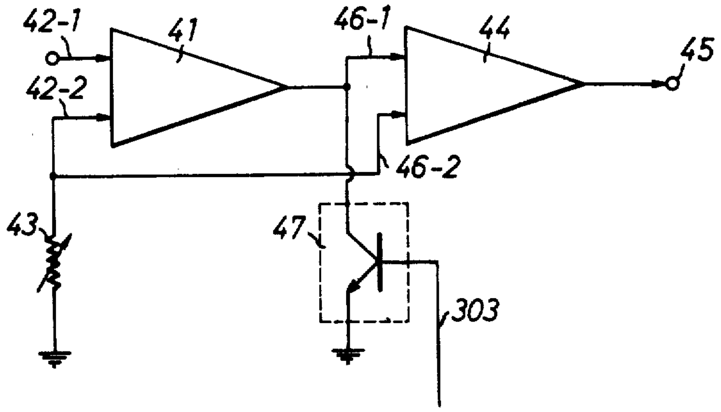
FIG. 4 is a block diagram illustrating examples of the bias circuit employed in this invention.

The bias circuit 6 comprises, for example, two dc amplifiers 41 and 44 as shown in FIG. 4. The dc amplifier 41 has an input 42-1 connected to the logarithmic compressor 15 and an input 42-2 connected to ground through a bias resistor 43. The output of the dc amplifier 41 is connected to an input 46-1 of the dc amplifier 44. The other input 46-2 of the dc amplifier 44 is commonly connected to the input 42-1 of the dc amplifier 41. The output 45 of the dc amplifier 44 is connected to the frequency modulator 16. The collecto-emitter path of a transistor 47 is connected to across the input 46-1 of the dc amplifier 44 and ground. The base of the transistor 47 is connected to the output 303 of the inhibit circuit 7.

As mentioned above, the echo suppressing function can be obtained in accordance with this invention by the additional provision of a comparator for comparing between DC signals above a certain value, a detector for detecting a threshold of a direct current, an inhibit circuit using a transistor switch, and a bias circuit. Accordingly, the system of this invention is simple and economical. Moreover, the lincompex telephone terminal equipment provides in accordance with this invention a function of echo suppression and serves for economization and simplification of telephone communication circuits employing the lincompex telephone system.

What we claim is:

1. A terminal equipment for a lincompex telephone system comprising:

first input terminal means for receiving a first voice signal from a near-end subscriber;

first level means connected to the first input terminal means for producing a first level signal representative of the instantaneous level changes of the first voice signal and having a different frequency range than said first voice signal;

compressor means connected to the first input signal terminal means and said first level means for compressing said first voice signal in response to said first level signal to produce a first constant-level voice signal;

first output terminal means electrically coupled to the first compressor means and the first level means for sending out the first constant-level voice signal and the first level signal to the far-end subscriber;

second input terminal means for receiving a second constant-level voice signal and a second level signal from a far-end subscriber, the second constant-level voice corresponding to a constant-level compressed signal of a second voice signal from the far-end subscriber, the second constant-level signal being representative of the instantaneous level changes of the second voice signal;

second level means connected to the second input terminal means for detecting the second level signal;

expander means connected to the second input terminal means and the second level means for reproducing the second voice signal from the second constant-level voice signal and the detected second level signal;

second output terminal means electrically coupled to the expander means for sending out the reproduced second voice signal to the near-end subscriber;

comparator means electrically coupled to said second level means for producing a second control output when the second level signal exceeds a first threshold level;

control means connected to the comparator means and the threshold means for fixing the first level signal to a second threshold level sufficiently lower than the first level signal in response to only the simultaneous existance of the first control signal and the second control signal; and said control means comprising an inhibit circuit for inhibiting the second control signal in response to the first control signal, and a bias circuit connected to the output of the inhibit circuit and the first level means for fixing the first level signal to the second threshold level in response to the output of the inhibit circuit.

2. A terminal equipment according to claim 1, in which said first compressor means includes a switch circuit controlled by the output of the inhibit circuit so as to cut-off a path between the first input terminal means and the first output terminal means.

* * * * *